US009069880B2

(12) United States Patent
Trim et al.

(10) Patent No.: US 9,069,880 B2
(45) Date of Patent: Jun. 30, 2015

(54) PREDICTION AND ISOLATION OF PATTERNS ACROSS DATASETS

(75) Inventors: Samuel T. Trim, Sammamish, WA (US); Brad Snow, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 13/421,905

(22) Filed: Mar. 16, 2012

(65) Prior Publication Data

US 2013/0246463 A1   Sep. 19, 2013

(51) Int. Cl.
| G06F 17/30 | (2006.01) |
| H04L 12/24 | (2006.01) |
| G06Q 30/02 | (2012.01) |
| H04L 29/08 | (2006.01) |
| G06Q 50/00 | (2012.01) |

(52) U.S. Cl.
CPC .... *G06F 17/30958* (2013.01); *G06F 17/30705* (2013.01); *H04L 41/147* (2013.01); *G06Q 30/02* (2013.01); *H04L 41/0677* (2013.01); *H04L 41/0631* (2013.01); *H04L 67/00* (2013.01); *G06Q 50/01* (2013.01)

(58) Field of Classification Search
CPC ............. G06F 17/30539; G06F 17/30958
USPC .................. 707/776, 737, 740, 780
See application file for complete search history.

(56) References Cited

U.S. PATENT DOCUMENTS

| 6,275,806 B1* | 8/2001 | Pertrushin ............... 704/272 |
| 7,340,458 B2* | 3/2008 | Vaithilingam et al. ......... 1/1 |
| 7,562,076 B2* | 7/2009 | Kapur .......................... 1/1 |
| 7,809,661 B2* | 10/2010 | D'Ambrosio ............... 706/45 |
| 8,010,400 B2* | 8/2011 | Mascarenhas ............. 705/7.29 |
| 8,176,046 B2* | 5/2012 | Druzgalski et al. ........ 707/731 |
| 8,229,957 B2* | 7/2012 | Gehrking et al. ........... 707/778 |
| 8,275,608 B2* | 9/2012 | Ah-Pine et al. .............. 704/9 |
| 8,457,950 B1* | 6/2013 | Gardner et al. ............... 704/9 |
| 8,515,900 B2* | 8/2013 | Flinn et al. ................ 707/603 |
| 2002/0013752 A1* | 1/2002 | Johnson et al. ............. 705/36 |
| 2005/0171948 A1* | 8/2005 | Knight ...................... 707/6 |
| 2007/0067285 A1* | 3/2007 | Blume et al. ................ 707/5 |
| 2009/0144609 A1* | 6/2009 | Liang et al. ............... 715/230 |
| 2010/0003969 A1* | 1/2010 | Isobe et al. .............. 455/412.1 |
| 2010/0005061 A1* | 1/2010 | Basco et al. ................ 707/3 |
| 2010/0070339 A1* | 3/2010 | Bae et al. ................. 705/10 |

(Continued)

OTHER PUBLICATIONS

Bezdek et al. (Efficient Implementation of the Fuzzy c-Means Clustering Algorithms, IEEE transactions on pattern Analysis and Machine Intelligence, vol. PAMI-8, No. 2, Mar. 1986).*

*Primary Examiner* — Miranda Le (74) *Attorney, Agent, or Firm* — Nicholas Chen; Kate Drakos; Micky Minhas (57) ABSTRACT

Various embodiments pertain to techniques for predicting and isolating patterns or trends across datasets. In various embodiments, one or more Q-entities are extracted from a data seed, associated with one or more dimensions, and classified into one or more clusters for each dimension with which it is associated. In some embodiments, a Q-entity can exist in more than one dimension and/or more than one cluster within a dimension. Once information from the data seed is associated with a dimension and cluster, frequency analysis can be utilized to ascertain a pattern or trend in the data. In various embodiments, additional data can be processed, added to the dimensions and clusters, and frequency analysis can be performed on the updated dataset to provide additional information on the pattern or trend.

17 Claims, 4 Drawing Sheets

(56) References Cited

U.S. PATENT DOCUMENTS

| | | | |
|---|---|---|---|
| 2011/0112826 A1* | 5/2011 | Wang et al. | 704/9 |
| 2011/0282860 A1* | 11/2011 | Baarman et al. | 707/709 |
| 2012/0158613 A1* | 6/2012 | Bollen et al. | 705/36 R |
| 2012/0215523 A1* | 8/2012 | Inagaki | 704/9 |
| 2012/0259240 A1* | 10/2012 | Llewellynn et al. | 600/558 |
| 2012/0272160 A1* | 10/2012 | Spivack et al. | 715/752 |

\* cited by examiner

PREDICTION AND ISOLATION OF PATTERNS ACROSS DATASETS

BACKGROUND

Billions of messages containing information are exchanged between people and computers via networks every day. Messages this numerous can lead to management and scalability issues for individual users and service providers alike. For example, some individual users may become overwhelmed by the vast amount of information available to them on a daily basis, such as through the internet, and choose to avoid certain websites in an attempt to close the pipeline from which the flood of information comes.

Services, however, cannot so easily reduce the amount of information passing through or about them, and can also face unintended consequences if they attempt to do so. For example, such services can be seen as not up to par by users if they fail during exceedingly busy periods or place a cap on the number of users for the service. Alternatively or additionally, the service provider can miss out on an opportunity to gather valuable information from users such as feedback from users about the service or other user insights. In some instances, missing out on important consumer insights can result in a user feeling frustrated and choosing to leave the service provider.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments pertain to techniques for predicting and isolating patterns or trends across datasets. In various embodiments, one or more Q-entities are extracted from a data seed, associated with one or more dimensions, and classified into one or more clusters for each dimension with which it is associated. In some embodiments, a Q-entity can exist in more than one dimension and/or more than one cluster within a dimension. Once information from the data seed is associated with a dimension and cluster, frequency analysis can be utilized to ascertain a pattern or trend in the data. In various embodiments, additional data can be processed, added to the dimensions and clusters, and frequency analysis can be performed on the updated dataset to provide additional information on the pattern or trend.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Messages numbering in the billions can lead to management and scalability issues for individual users and service providers alike. Service providers can be perceived as subpar by users if they fail (or "crash") during exceedingly busy periods or place a cap on the number of users for the service. Alternatively or additionally, the service provider can miss out on an opportunity to gather valuable information from users such as feedback from users about the service or other user insights. In some instances, such information can enable service providers to identify and fix issues or problems with the service more quickly than if a service provider had to troubleshoot the entire service. For example, by obtaining information from various users that a particular email service is unavailable, the service provider can determine how widespread the problem may be (e.g., how many users are impacted), whether it is isolated to a particular geographic area or a global problem, and how long the problem persisted.

Furthermore, snippets of information, or Q-entities, contained in various messages transmitted across different networks and/or platforms can appear to be babble or unimportant, but when viewed in a greater context, can provide insight to trends and patterns. For example, while a single sentence or image posting about a particular fashion selection (a seemingly strange color combination, for example) may seem inconsequential, when coupled with a celebrity status and/or large audience of followers, the fashion selection may indicate a forthcoming trend.

Likewise, putting a snippet of information into context can lead to additional information about the source of the snippet. For example, a reference to a video game may be perceived as simply a pop culture reference, but assuming the video game was released only in Europe, it can also provide a hint to the location of the source.

Various embodiments pertain to techniques for predicting and isolating patterns or trends across datasets. In various embodiments, one or more Q-entities are extracted from a data seed, associated with one or more dimensions, and classified into one or more clusters for each dimension with which it is associated. In some embodiments, a Q-entity can exist in more than one dimension and/or more than one cluster within a dimension. Once information from the data seed is associated with a dimension and cluster, frequency analysis can be utilized to ascertain a pattern or trend in the data. In various embodiments, additional data can be processed, added to the dimensions and clusters, and frequency analysis can be performed on the updated dataset to provide additional information on the pattern or trend.

In the discussion that follows, a section entitled "Example Operating Environment" describes an operating environment in accordance with one or more embodiments. Next, a section entitled "Example Embodiments" describes various embodiments utilizing techniques for predicting and isolating patterns or trends across datasets. In particular, data seeds can be filtered using a relational graph model and rising trends can be analyzed. Finally, a section entitled "Example Device" describes an example device that can be used to implement one or more embodiments.

Consider, now, an example operating environment in accordance with one or more embodiments.

Example Operating Environment

Figure 1:
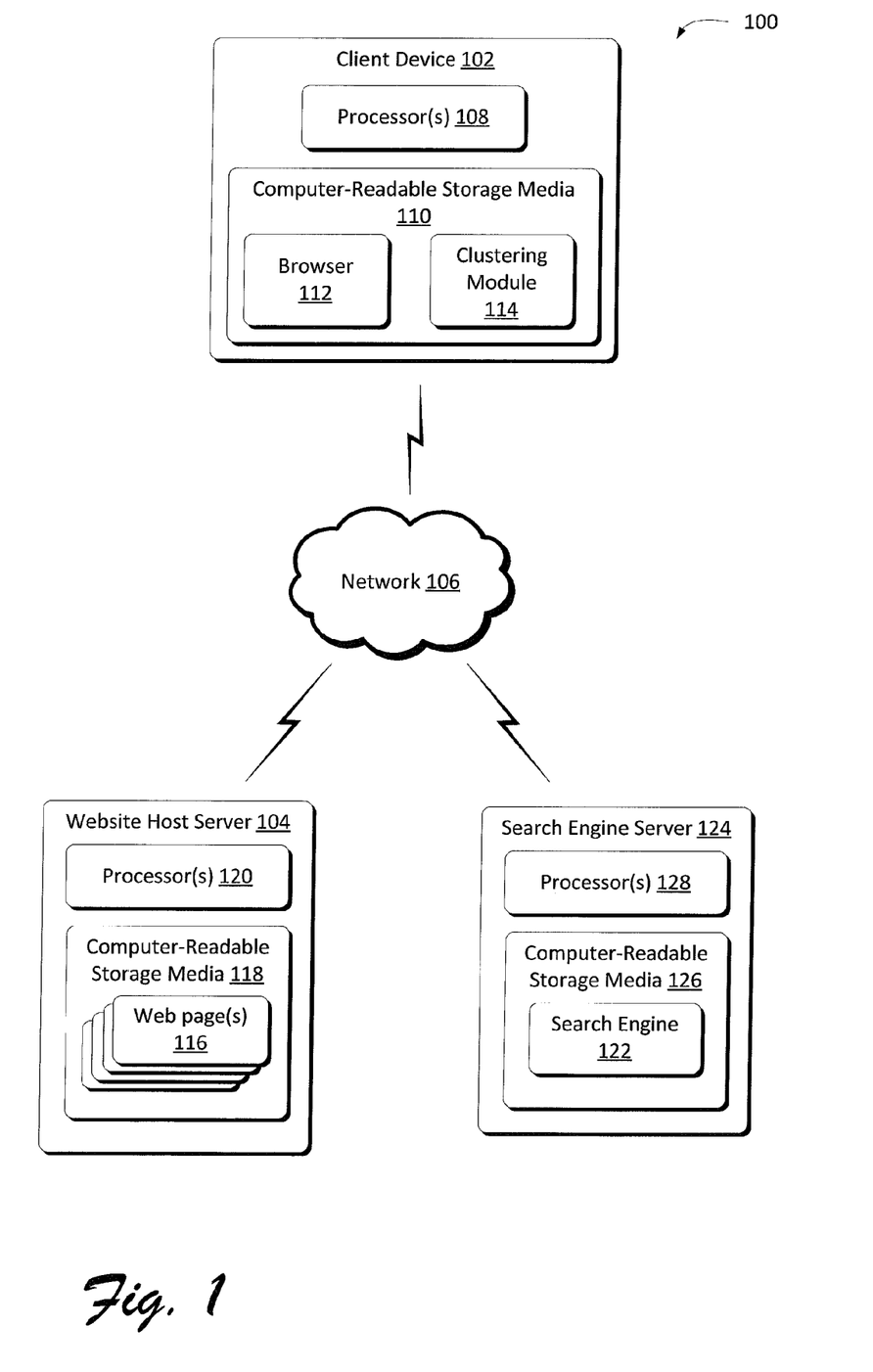
FIG. 1 illustrates an example environment in accordance with one or more embodiments.

FIG. 1 is an illustration of an example environment 100 in accordance with one or more embodiments. Environment 100 includes a client device 102 communicatively coupled to a website host server 104 through network 106.

Client device 102 can include one or more processors 108 and computer-readable storage media 110. Client device 102 can be embodied as any suitable computing device such as, by way of example and not limitation, a desktop computer, a portable computer, a netbook, a handheld computer such as a personal digital assistant (PDA), a cell phone, and the like.

Computer-readable storage media 110 includes one or more software applications, which can include a software executable module in the form of a web browser 112. Browser 112 can receive content from and send content to other servers, such as website host server 104, via network 106, such as the Internet. Such content can include any suitable type of content that can be received from and sent to websites hosted by servers. In various embodiments, browser 112 is configured to send a request for a web page to be displayed to a user.

In addition to browser 112, computer-readable storage media 110 can include a software executable module in the form of a clustering module 114. Clustering module 114 is configured to receive information, such as snippets of information received by browser 112, and can sort the information into one or more dimensions and/or clusters effective to predict and isolate a trend or pattern present in the information. For example, a web page, such as web page 116, can be a data seed from which information can be extracted. Clustering module 114 can extract information as one or more Q-entities from the data seed, associate each Q-entity with one or more dimensions and, in various embodiments, classify each Q-entity into one or more clusters for each dimension with which it is associated. Once information from the data seed (e.g., web page 116) is associated with a dimension and cluster, frequency analysis can be utilized to ascertain a pattern or trend in the data.

Web page 116 resides on computer-readable storage media 118 of website host server 104. Website host server 104 also includes one or more processors 120 configured to execute the software modules residing on computer-readable storage media 118. Q-entities can be extracted from content included on the web page 116 that is displayed by browser 112 (e.g., text on the web page), or from information included in the code corresponding to the web page 116 (e.g., information contained in code for the web page, an IP address from which the web page was received, etc.).

In various embodiments, additional Q-entities may be obtained based on the Q-entities extracted from the data seed. For example, in various embodiments, browser 112 is configured to send a user query to a search engine 122 and cause a search engine results page (SERP) received from the search engine server 124 to be displayed to a user via client device 102. Search engine 122 resides on computer-readable storage media 126 of search engine server 124. In addition to computer-readable storage media 126, search engine server 124 also includes one or more processors 128 configured to execute the software modules, e.g., search engine 122, residing on computer-readable storage media 126.

In various embodiments, search engine 122 receives and processes a user query containing at least one Q-entity extracted from the initial data seed and returns a listing of web search results corresponding to the query. The listing of web results can be presented, for example, as a listing of hyperlinks that, when a user selects one of the hyperlinks, redirects the user's browser to the resultant web page, which can be hosted on an additional server connected to the network 106. The resultant web page to which each of the hyperlinks redirects a user's web browser can be a subsequent data seed that can be used by the clustering module 114 to obtain additional Q-entities.

The computer-readable storage media included in each device or server can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 4.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having described an example environment, consider now a discussion of predicting and isolating patterns or trends across datasets in accordance with one or more embodiments.

Example Embodiments

Figure 2:
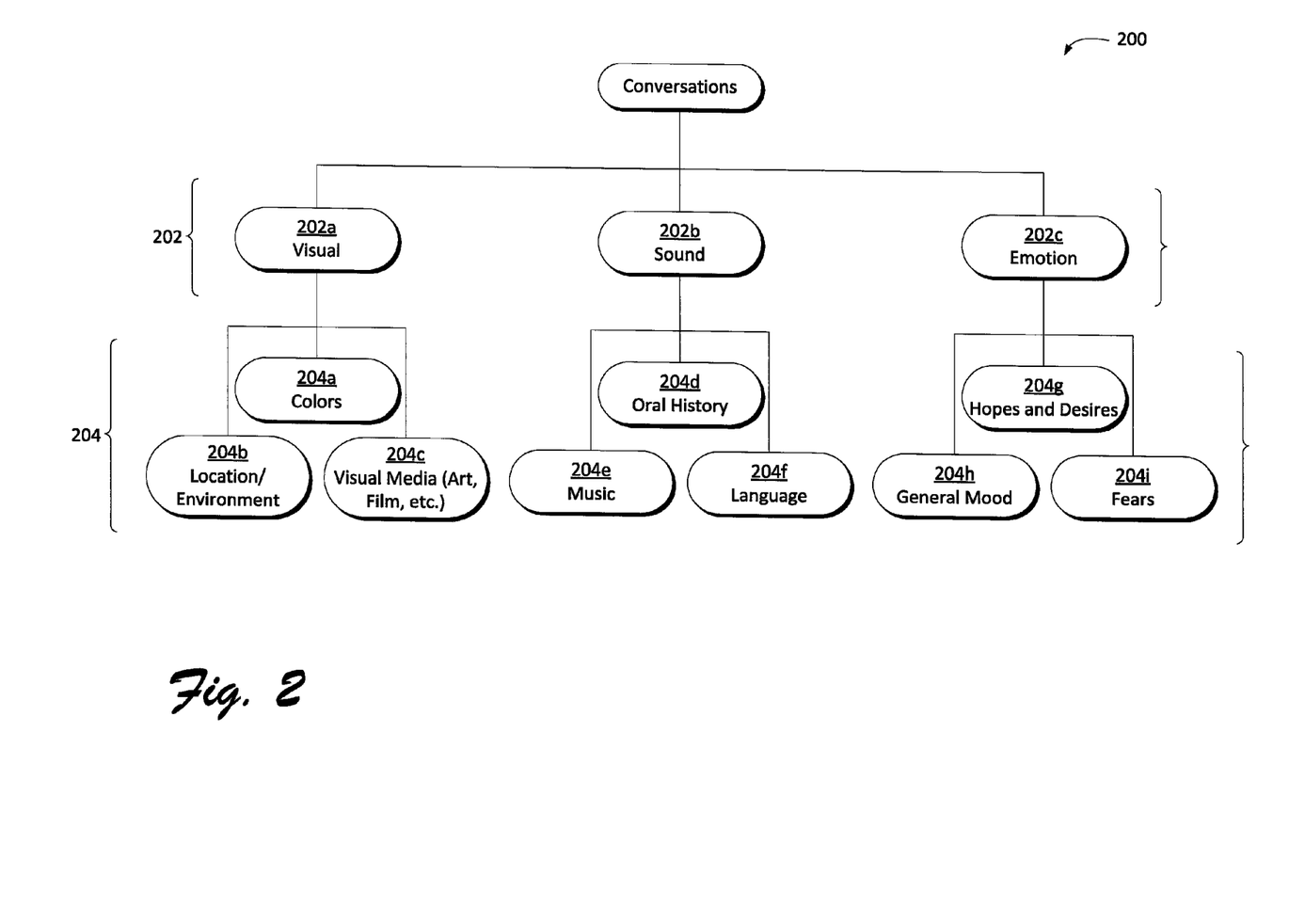
FIG. 2 depicts an example relational graph model in accordance with one or more embodiments.

FIG. 2 depicts an example relational graph model 200 in accordance with one or more embodiments. Relational graph model 200 can be used, for example, to filter information from data seeds into a form suitable for frequency analysis.

Within relational graph model 200, a hierarchy exists that includes various Q-dimensions 202 for conversations, each of which includes various Q-clusters 204. Conversations can be in the form of email, web articles, news, social media posts and trends. For example, the visual dimension 202a includes three Q-clusters: colors 204a, location/environment 204b, and visual media 204c. Likewise, the sound dimension 202b includes three Q-clusters: oral history 204d, music 204e, and language 204f. The emotion dimension 202c also includes three Q-clusters: hopes and desires 204g, general mood 204h, and fears 204i.

As shown in FIG. 2, each Q-dimension 202 is a sensory dimension that can be used to classify and group Q-entities into Q-clusters. The Q-clusters 204 represent fuzzy c-means clusters in which Q-entities are grouped over time. Frequency analysis can be performed on the Q-clusters to determine the strength or value of a given Q-entity in a particular Q-cluster. In other words, frequency analysis can result in a value representative of clustering patterns that signify relational ties between Q-entities. These relational ties can indicate context for a particular trend. The higher the frequency (e.g., occurrence of patterns) from heavy to low weighted sources can cause a trend or pattern to be detected. To illustrate how a trend can be identified using relational graph model 200, consider the process shown in FIG. 3.

Figure 3:
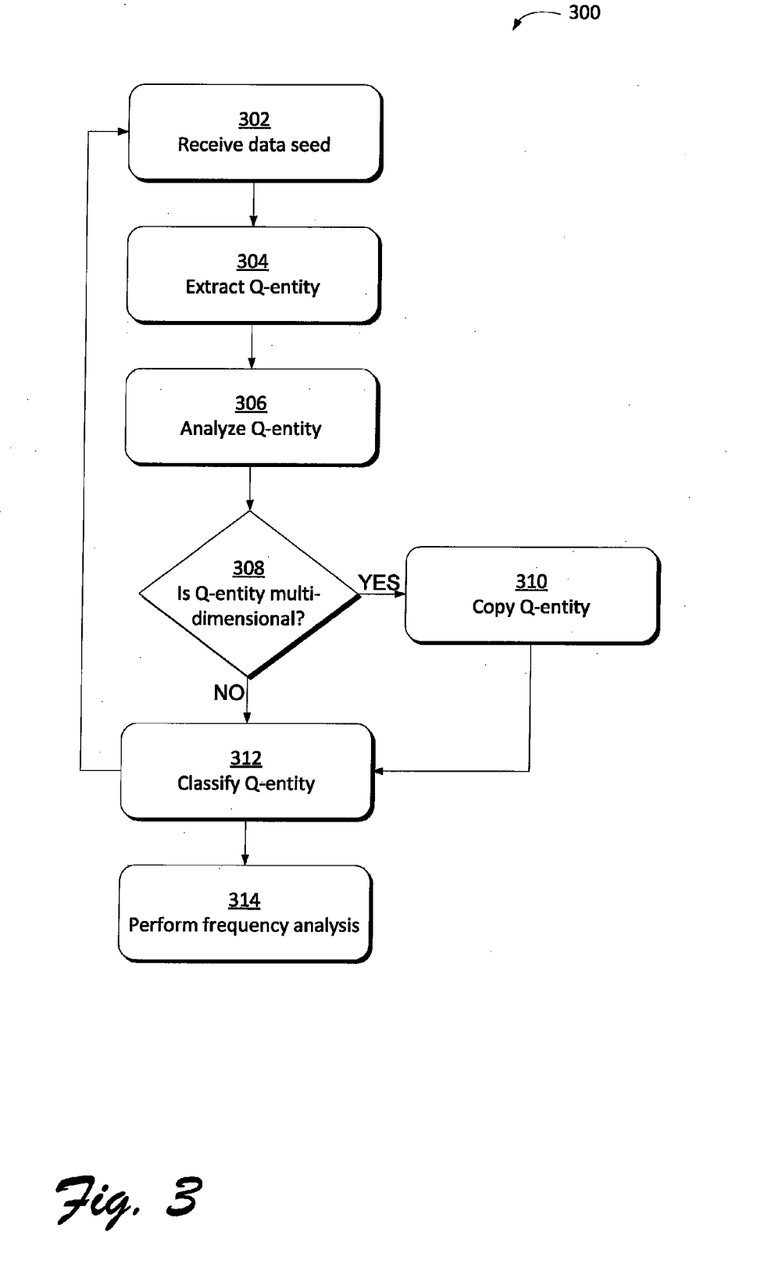
FIG. 3 illustrates an example process in accordance with one or more embodiments.

FIG. 3 illustrates an example process 300 that can be performed by a client device, for example, for predicting and isolating patterns or trends across various datasets. Process 300 can be implemented in connection with any suitable hardware, software, firmware, or combination thereof. In at least some embodiments, the process can be implemented in software.

Block 302 receives a data seed. This can be performed in any suitable way. For example, clustering module 114 can receive user input including a post from a microblogging service, such as Twitter® (Twitter® is a registered trademark of Twitter, Inc.). Data seeds can be a post from a social network service, a result from a search engine, information obtained from a trend map service, information obtained from website analytics, or information from a publicly available database, to name just a few examples. In other words, a data seed can be obtained using a variety of tools, such as social network services (e.g., Facebook® (Facebook® is a registered trademark of Facebook, Inc.)), search engines (e.g., Bing® (Bing® is a registered trademark of Microsoft Corporation)), trend map services, website analytics, and other publicly available databases and records. In some embodiments, user input can include selection of a button or copying/pasting of the data seed into a user interface associated with the clustering module. In some embodiments, data seeds can be automatically transmitted to the clustering module by the browser, such as through a plug-in or other transmission mechanism. As an example, a user can post a message on a social network, and the message posted can be a data seed input into the clustering module.

Next, block 304 extracts one or more Q-entities from the data seed received by block 302. This can be performed in any suitable way. For example, one or more keywords can be extracted from the data seed. Assume, for instance, that the data seed received is a message posted on a social network about a user's excitement about seeing a particular band in concert. The Q-entities extracted from the data seed can include the band name, words used by the user to express emotion (e.g., excitement or tone), the user's username on the social network site, the date and/or time the message was posted, and the user's location according to the user's social network profile. Other Q-entities can be extracted from the data seed, depending on the particular type of data seed received by block 302.

Block 306 analyzes each Q-entity. This can be performed in any suitable way. For example, each Q-entity extracted by block 304 can be analyzed in order to identify one or more dimensions, such as Q-dimensions 202, applicable to the Q-entity. For example, the user's location according to the user's social network profile may belong to the visual dimension 202a, while the words used by the user to express emotion may belong to the emotion dimension 202c. Each Q-entity can be assigned to one or more dimensions, depending on the Q-entity and the dimensions provided in the embodiment.

Block 308 determines if the Q-entity is multi-dimensional. This can be performed in any suitable way. For example, if the analysis in block 306 indicates that the Q-entity may belong in more than one dimension, the Q-entity can be determined to be multi-dimensional. In such instances, block 310 copies the Q-entity such that a copy of the Q-entity can be entered into each applicable dimension. For example, if the user expresses excitement about the concert by using a slang term from a certain geographic area, the Q-entity may belong in both visual dimension 202a and emotion dimension 202c. In such embodiments, the Q-entity is copied such that the Q-entity can be processed under both the visual and emotion dimensions. If the Q-entity is not multi-dimensional, the process proceeds to block 312.

Block 312 classifies each Q-entity, including any copies of Q-entities created by block 310. This can be performed in any suitable way. For example, each Q-entity can be classified according to one or more Q-clusters in the Q-dimension. Continuing with the example of the Q-entity describing the user's excitement, the Q-entity can be classified in the cluster representing location/environment 204b within the visual dimension 202a and in the cluster representing general mood 204h within the emotion dimension 202c. Each Q-entity for the data seed extracted by block 304 (along with any copies created by block 310) is classified. A Q-entity can belong to any one or more Q-clusters within a given dimension.

In various embodiments, fuzzy clustering is utilized to classify Q-entities extracted from one or more data seeds into one or more Q-clusters. In these embodiments, Q-entities can belong to more than one cluster and have a particular importance or strength within each cluster.

Various fuzzy clustering algorithms can be used for clustering Q-entities and determining the strength of the Q-entity within each Q-cluster. The Fuzzy C-Means (FCM) algorithm is but one example of a fuzzy clustering algorithm. The FCM algorithm attempts to divide n elements into a collection of clusters, such as Q-clusters. For a finite set of data, such as n Q-entities, the algorithm returns a list of centers for the Q-cluster and a partition matrix. The collection of n elements can be represented according to an expression, which can be represented according to an expression:

$$X=\{x_1, \ldots, x_n\}$$

and the collection of centers for the Q-clusters can be represented according to an expression:

$$C=\{c_1, \ldots, c_c\},$$

The partition matrix can be represented according to an expression:

$$U=u_{i,j}\epsilon[0,1], i=1, \ldots, n, j=1, \ldots, c$$

where each element $u_{i,j}$ indicates the degree to which element $x_i$ belongs to cluster $c_j$. The FCM algorithm can be represented according to an expression:

$$u_k(x) = \frac{1}{\sum_j \left(\frac{d(center_{k,x})}{d(center_{j,x})}\right)^{\frac{2}{(m-1)}}}$$

where $u_k(x)$ is a strength of an entity x in the cluster and m is a fuzzifier. The fuzzifier m determines the level of cluster fuzziness, where a large m results in smaller strengths $u_{i,j}$ and fuzzier clusters. In various embodiments, fuzzifier m can be set equal to zero or 1 where there are greater than 150 nodes (e.g., n>150) and equal to 2 where the number of nodes is 150 or less (e.g., n≤150). In various embodiments, a node is a unique, discrete source of data.

The process can return to block 302 to receive additional seed data. For example, a Q-entity extracted from a first data seed can lead to a subsequent data seed from which additional Q-entities can be extracted, analyzed and classified. For instance, the slang terminology used to express excitement can lead to a data seed related to a regional dialect, a particular language, a location, or the like. In some embodiments, the use of particular words or spellings for words can be attributed to a particular group of people to which the user may belong. Each of these associations can be a new data seed received by block 302.

Upon classification of one or more Q-entities into various Q-clusters, block 314 performs frequency analysis. This can be performed in any suitable way. For example, the Q-cluster can include a number of Q-entities, a first portion of which relates to a first specific concept and a second portion of which relates to a second specific concept. For example, for the Q-cluster location/environment 204b, there can be 15 Q-entities, twelve of which relate to Cincinnati, Ohio and three of which relate to Seattle, Wash. This can illuminate a strong tie to Cincinnati, Ohio and a potential secondary tie to Seattle, Wash. These illuminated ties, trends, or patterns that become apparent through frequency analysis can be further enhanced through the use of additional data sources.

In various embodiments, a customized implementation of the FCM algorithm is utilized to produce a collection of related data with a high frequency of occurrences over time. The algorithm can be represented according to an expression $$\text{trend} = \sum_{t=-\infty}^{\infty} \left( \frac{\left( \sum_{d=1}^{3} \left( \sum_{k=1}^{3} (FCM) \right) \right)}{\Delta t} \right)$$

where t is a time ranging from negative infinity to infinity, d is a dimension, such as a Q-dimension, with a value ranging from one to three, and k is a sub-dimension, such as a Q-cluster, with a value ranging from one to three. For the time variable, a value of zero represents the origin, negative infinity represents that time before the origin, and infinity represents the time post-origin. For the dimension and sub-dimension variable, each Q-dimension and Q-cluster is assigned a particular value for use in the equation. For example, the visual dimension can be assigned a value for d of one, with the location/environment cluster having a k value of one, the visual-media cluster having a k value of two, and the color cluster having a k value of three.

To better illuminate the processes described herein, consider the following example in which a company uses the techniques described to identify and troubleshoot a service problem. Assume that a company that provides a software service, such as web-based email, monitors various avenues for consumer feedback. For example, the company operates an account on various social networks such as Twitter® and Facebook® to enable consumers to directly contact the company with comments, questions, or help requests. The company also monitors, through running various online searches, such as through search engine 122, online postings that deal with the company and its products. The company may perform these tasks by assigning one or more employees to perform the service via client device 102 or may use an automated data mining system running on client device 102 to obtain the necessary information.

A first data seed may be received by the clustering module. For example, a posting, or "tweet," on Twitter® includes the company's name. The entire posting can be processed, such as via process 300. In particular, the posting has mentioned that the company's email service is not accessible by the user. As additional postings including the company's name, email service, or the like are processed by the system, frequency analysis can provide information alerting the company to an outage. In addition, frequency analysis may indicate that the outage is located only in the Midwest, perhaps indicating that a particular server is the source of the problem. Such frequency analysis may not be readily apparent from the postings on Twitter®, however.

In various embodiments, additional data sources can be utilized to obtain more information. In the example above, upon identifying a trend regarding a service outage, additional public databases can be utilized to extract more data. For example, if one or more user's postings are associated with a geo-location indicator, the indicator can be utilized to determine a location for the user. When multiple users are associated with close locations (e.g., 50 users in Southwestern Ohio), another trend begins to emerge through frequency analysis. Locations may also be determined, for example, from information included in a user's profile, or through tracing the user's profile to additional information about the user. For example, the user's username on Twitter® can be the personalized domain of the user on Facebook® which gives the user's first and last name. When the user's first and last name is entered into a search engine, one or more articles regarding the user in a particular city may be returned. As another example, if a majority of a user's social network connections (e.g., followers or fiends) are associated with a particular location, location surfaces as a trend according to frequency analysis.

In various embodiments, the identification of one pattern or trend in the data can lead to others. Event correlation enables additional trends to be detected in the same or similar fashion to the fashion in which the first pattern or trend in the data was identified. For example, if a service outage is identified through frequency analysis, searching for additional information related to the service outage can indicate additional trends, such as the particular nature of the outage, when it first began occurring, and the like. If a time that the problem first began occurring is identified, the problem may be able to be traced back to an upgrade or alteration in the code, for example.

As another example, consider the use of the techniques described to identify and predict an emerging style/fashion trend. Assume that an entity, perhaps a company seeking to tie in with emerging trends as part of a marketing plan, monitors various avenues for fashion and style appearances. For example, the entity monitors celebrity events and endorsements through exploring photographs of celebrities, celebrity postings on social media sites, and additionally considers consumer feedback on the images of these celebrities. The entity may perform these tasks by assigning one or more employees to perform the service via client device 102 or may use an automated data mining system running on client device 102 to obtain the necessary information.

A first data seed may be received by the clustering module. For example, an image of a celebrity on the red carpet of a particular awards show can be selected. The entire image can be processed, such as via process 300. In particular, the image includes a particular celebrity, wearing an outfit with a particular cut, color (or combination of colors), accessories, and the like. The outfit was designed by a particular designer. The celebrity also had a particular hair and make-up style for the event. Each of these attributes can be processed through the relational graph model. In addition, other sources, such as social networks, can provide additional seed data, such as data that indicates if certain social network users like or dislike the celebrity's look or various components of the look. Data regarding the location of various users commenting on the image can also be used to identify a possible trend.

In some embodiments, multiple images or other data seeds can be processed and analyzed to indicate that a particular trend, such as a fashion trend inspired by the 1950's, is emerging. For example, Entity X and Entity Y are two male pop/rock musicians donning a pompadour haircut and Buddy-Holly glasses. The pompadour style for men surfaced from the 1950's made popular by rock legends such as Little Richard, Elvis Presley and the rockabilly culture. Buddy-Holly style glasses emerged during the mid-50's as a signature style element worn by rock and roll pioneer Buddy Holly.

Emotion gleaned from this observation is a mix of rebellion and carefree excitement, due to the relational tie to the hairstyle's point of origin and entities that brought this style element trend to popularity.

Example Device

Figure 4:
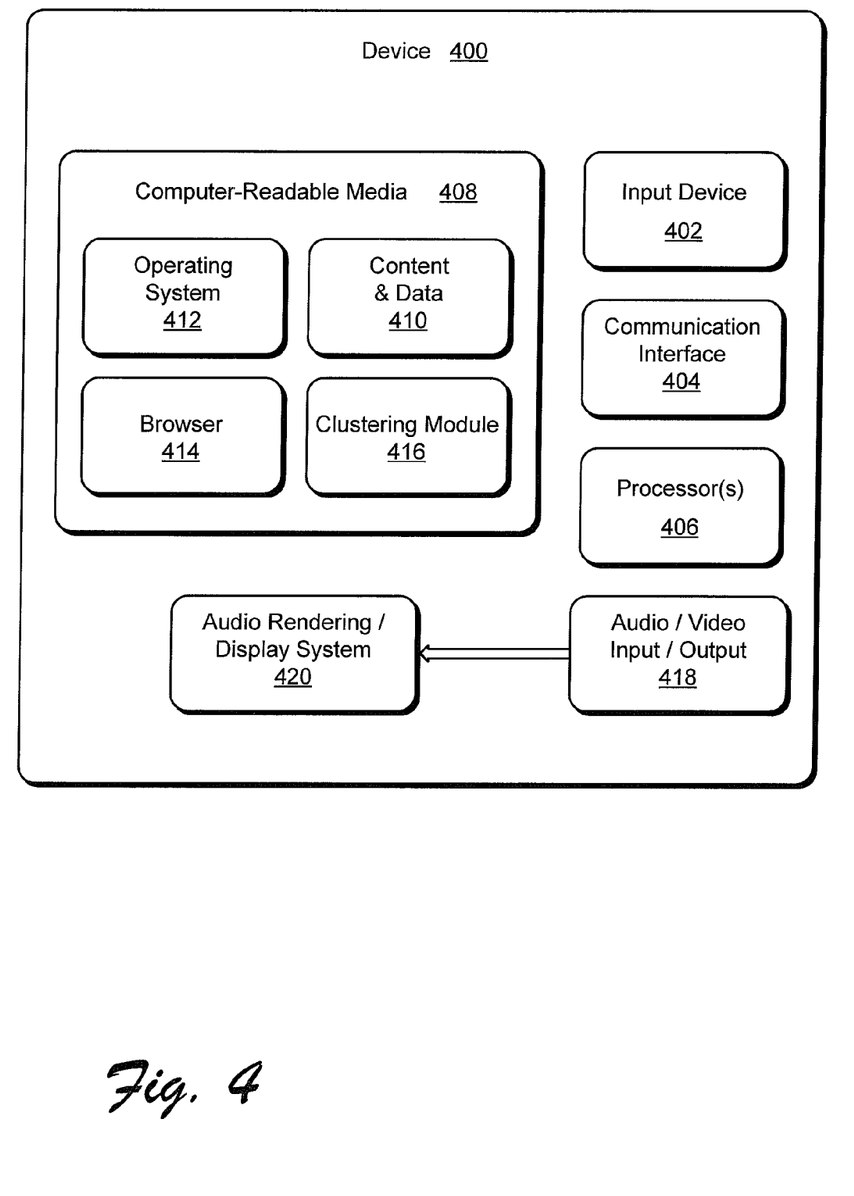
FIG. 4 is a block diagram of an example device that can be used to implement one or more embodiments.

FIG. 4 illustrates an example computing device 400 that can be used to implement the various embodiments described above. Computing device 400 can be, for example, client device 102 of FIG. 1, or any other suitable computing device.

Device 400 includes input device 402 that may include Internet Protocol (IP) input devices as well as other input devices, such as a keyboard. Device 400 further includes communication interface 404 that can be implemented as any one or more of a wireless interface, any type of network interface, and as any other type of communication interface. A network interface provides a connection between device 400 and a communication network by which other electronic and computing devices can communicate data with device 400. A wireless interface can enable device 400 to operate as a mobile device for wireless communications.

Device 400 also includes one or more processors 406 (e.g., any of microprocessors, controllers, and the like) which process various computer-executable instructions to control the operation of device 400 and to communicate with other electronic devices. Device 400 can be implemented with computer-readable media 408, such as one or more memory components, examples of which include random access memory (RAM) and non-volatile memory (e.g., any one or more of a read-only memory (ROM), flash memory, EPROM, EEPROM, etc.). A disk storage device may be implemented as any type of magnetic or optical storage device, such as a hard disk drive, a recordable and/or rewriteable compact disc (CD), any type of a digital versatile disc (DVD), and the like.

Computer-readable media 408 provides data storage to store content and data 410, as well as device executable modules and any other types of information and/or data related to operational aspects of device 400. One such configuration of a computer-readable medium is signal bearing medium and thus is configured to transmit the instructions (e.g., as a carrier wave) to the hardware of the computing device, such as via the network 106. The computer-readable medium may also be configured as a computer-readable storage medium and thus is not a signal bearing medium. Examples of a computer-readable storage medium include a random access memory (RAM), read-only memory (ROM), an optical disc, flash memory, hard disk memory, and other memory devices that may use magnetic, optical, and other techniques to store instructions and other data. The storage type computer-readable media are explicitly defined herein to exclude propagated data signals.

An operating system 412 can be maintained as a computer executable module with the computer-readable media 408 and executed on processor 406. Device executable modules can also include browser 414 and clustering module 416 described above and below. Clustering module 416 can be, for example, clustering module 114.

Device 400 also includes an audio and/or video input/ output 418 that provides audio and/or video data to an audio rendering and/or display system 420. The audio rendering and/or display system 420 can be implemented as integrated component(s) of the example device 400, and can include any components that process, display, and/or otherwise render audio, video, and image data.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable storage devices. The features of the techniques described above are platform-independent, meaning that the techniques may be implemented on a variety of commercial computing platforms having a variety of processors.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A method comprising:
receiving a data seed for use in identifying a trend across data in a network-based environment;
extracting a Q-entity from the data seed;
obtaining additional Q-entities based on the Q-entity extracted from the data seed, wherein a subsequent data seed is utilized to obtain the additional Q-entities, the subsequent data seed comprising a web page to which each of a plurality of hyperlinks redirect a web browser;
analyzing each Q-entity to determine when the Q-entity belongs to more than one dimension;
analyzing, using a relational graph model having at least one Q-dimension having at least one Q-cluster, the Q-entity effective to associate one of the Q-entities with the at least one Q-cluster and the at least one Q-dimension of the relational graph; and
identifying, based on a frequency analysis of the Q-cluster in the relational graph model to determine clustering patterns that signify relational ties between Q-entities that are used to identify the trend, wherein the trend is identified according to an expression:

$$\_trend = \sum_{t=-\infty}^{\infty} \left( \frac{\left( \sum_{d=1}^{3} \left( \sum_{k=1}^{3} (FCM) \right) \right)}{\Delta t} \right)$$

where t is a time ranging from negative infinity to infinity with 0 being a time of origin, d is a value assigned to the at least one Q-dimension with which the Q-entity is associated, and k is a value assigned to the at least one Q-cluster with which the Q-entity is associated, and wherein the value of d is a number from one to three assigned to the at least one Q-dimension, and wherein the value of k is a number from one to three assigned to the at least one Q-cluster.

2. The method of claim 1, the at least one Q-dimension comprising one or more of a visual dimension, a sound dimension, or an emotion dimension.

3. The method of claim 2, the at least one Q-cluster of the visual dimension comprising one or more of colors, location/ environment, or visual media.

4. The method of claim 2, the at least one Q-cluster of the sound dimension comprising one or more of oral history, music, or language.

5. The method of claim 2, the at least one Q-cluster of the emotion dimension comprising one or more of hopes and desires, general mood, or fear.

6. The method of claim 1, extracting at least one Q-entity comprising extracting one or more: keywords, words used to express emotion, a username on a social network site, a date and/or time a message was posted, or a user's location according to a user's social network profile.

7. The method of claim 1, analyzing the Q-entity comprising classifying the Q-entity into the at least one Q-cluster using fuzzy clustering.

8. The method of claim 7, using fuzzy clustering comprising determining a strength of a Q-entity in a cluster according to an expression:

$$u_k(x) = \frac{1}{\sum_j \left(\frac{d(center_{k,x})}{d(center_{j,x})}\right)^{\frac{2}{(m-1)}}}$$

where $u_k(x)$ is a strength of a Q-entity x in a cluster k and m is a fuzzifier equal to 0, 1 or 2.

9. One or more computer-readable storage media comprising instructions that are executable to cause a device to perform a process comprising:
   extracting, from a data seed, one or more Q-entities;
   obtaining additional Q-entities based on the one or more Q-entities extracted from the data seed, wherein a subsequent data seed is utilized to obtain the additional Q-entities, the subsequent data seed comprising a web page to which each of a plurality of hyperlinks redirect a web browser;
   analyzing the Q-entity to determine when the Q-entity belongs to more than one dimension;
   analyzing using a relational graph model having a plurality of Q-dimensions each having a plurality of Q-clusters, each of the Q-entities effective to associate each Q-entity with a Q-cluster and Q-dimension; and
   identifying, based on frequency analysis of the Q-clusters in the relational graph model to determine clustering patterns that signify relational ties between Q-entities that are used to identify a trend in a web environment to which the data seed pertains, wherein the trend is identified according to an expression:

$$\_trend = \sum_{t=-\infty}^{\infty} \left(\frac{\left(\sum_{d=1}^{3}\left(\sum_{k=1}^{3}(FCM)\right)\right)}{\Delta t}\right)$$

where t is a time ranging from negative infinity to infinity with 0 being a time of origin, d is a value assigned to the at least one Q-dimension with which the Q-entity is associated, and k is a value assigned to the at least one Q-cluster with which the Q-entity is associated, and
   wherein the value of d is a number from one to three assigned to the at least one Q-dimension, and wherein the value of k is a number from one to three assigned to the at least one Q-cluster.

10. The one or more computer-readable storage media of claim 9, extracting one or more Q-entities comprising extracting one or more: keywords, words used to express emotion, a username on a social network site, a date and/or time a message was posted, or a user's location according to a user's social network profile.

11. The one or more computer-readable storage media of claim 9, the data seed comprising a post from a microblogging service, a post from a social network service, a result from a search engine, information obtained from a trend map service, information obtained from website analytics, or information from a publicly available database.

12. The one or more computer-readable storage media of claim 9, the plurality of Q-dimensions comprising a visual dimension, a sound dimension, and an emotion dimension, wherein each of the plurality of Q-dimensions is assigned a value from one to three.

13. The one or more computer-readable storage media of claim 12, the plurality of Q-clusters of the visual dimension comprising colors, location/environment, and visual media.

14. The one or more computer-readable storage media of claim 12, the plurality of Q-clusters of the sound dimension comprising oral history, music, and language.

15. The one or more computer-readable storage media of claim 12, the plurality of Q-clusters of the visual dimension comprising hopes and desires, general mood, and fears.

16. A device comprising:
   one or more processors;
   one or more computer-readable storage media;
   one or more modules embodied on the one or more computer-readable storage media and executable under the influence of the one or more processors, the one or more modules configured to:
      extract, from a data seed from a web environment, Q-entities;
      obtain additional Q-entities based on the Q-entity extracted from the data seed, wherein a subsequent data seed is utilized to obtain the additional Q-entities, the subsequent data seed comprising a web page to which each of a plurality of hyperlinks redirect a web browser;
      analyze each Q-entity to determine when the Q-entity belongs to more than one dimension;
      analyze each Q-entity using a relational graph model having three Q-dimensions, each Q-dimension having three Q-clusters; and
      identify a trend present in the web environment according to related concepts in one or more of the Q-clusters by determining clustering patterns that signify relational ties between the Q-entities, wherein the trend is identified according to an expression:

$$\_trend = \sum_{t=-\infty}^{\infty} \left(\frac{\left(\sum_{d=1}^{3}\left(\sum_{k=1}^{3}(FCM)\right)\right)}{\Delta t}\right)$$

where t is a time ranging from negative infinity to infinity with 0 being a time of origin, d is a value assigned to the at least one Q-dimension with which the Q-entity is associated, and k is a value assigned to the at least one Q-cluster with which the Q-entity is associated, and
   wherein the value of d is a number from one to three assigned to the at least one Q-dimension, and wherein the value of k is a number from one to three assigned to the at least one Q-cluster.

17. The device of claim 16, wherein the one or more modules being configured to analyze each Q-entity comprises the one or more modules being configured to:
   assign a unique value from one to three to each of the Q-dimensions and to each of the Q-clusters within a dimension; and
   utilize a fuzzy clustering algorithm to determine the one or more Q-dimensions and the one or more Q-clusters to which the Q-entity belongs, wherein utilizing the fuzzy clustering algorithm comprises using the unique value to represent the Q-dimension and Q-cluster to which it is assigned.

* * * * *